United States Patent Office 3,681,245
Patented Aug. 1, 1972

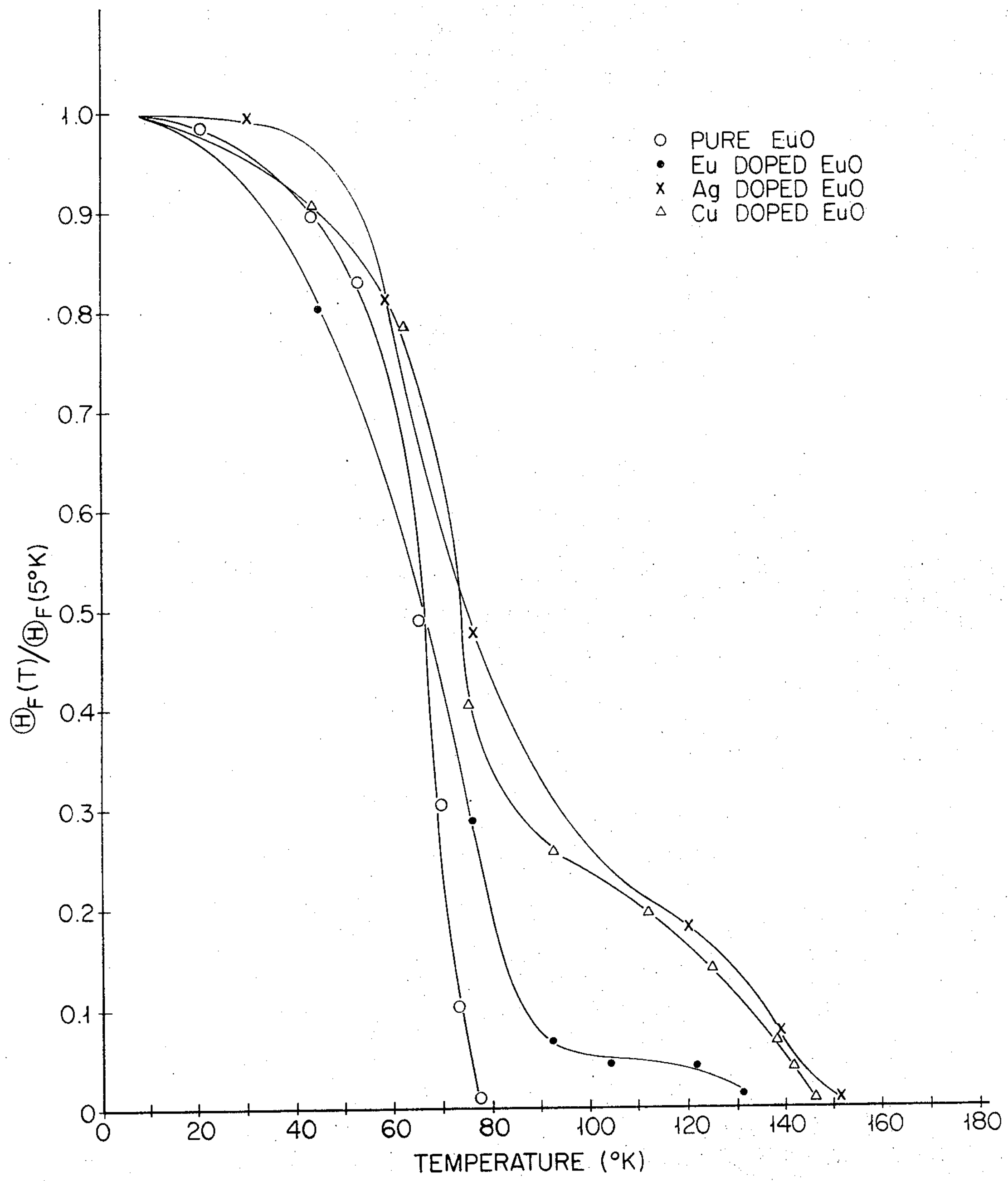
INVENTOR.
KENNETH LEE
BY Melvyn David Silver
AGENT

3,681,245

EuO FILMS WITH ENHANCED MAGNETIC EXCHANGE

Kenneth Lee, Palo Alto, Calif., assignor to International Business Machines Corporation, Armonk, N.Y.

Filed Dec. 10, 1970, Ser. No. 96,823
Int. Cl. C04b *35/50*
U.S. Cl. 252—62.55 4 Claims

ABSTRACT OF THE DISCLOSURE

A ferromagnetic composition consisting essentially of EuO doped with excess Eu and a monovalent metal chosen from the group consisting of Ag, Cu, Au, Na, K, In. By such doping, the Curie point of EuO is raised from 77° K. to 150° K., with an increase in the electrical resistivity as well.

FIELD OF THE INVENTION

Magnetic compositions in general, and ferromagnetic compositions of the rare earth oxide type in particular.

BACKGROUND

It is often desirable to be able to raise or control the Curie temperature of various compounds that operate in a cryogenic temperature region. Such control makes them more readily useful in various types of devices, such as low temperature beam addressable storage systems, which utilize the Kerr or Faraday magnetooptic effect. One material known to have good magnetic properties at 77° K. is europium oxide.

Not all europium compounds are ferromagnetic. Compounds such as $EuCu_2$, $CuEu_2O_4$, $EuHe_5$, and $EuCu_5$ are not known to be ferromagnetic at or above 77° K. For example, $EuCu_2$ is metamagnetic with a low Neel or transition temperature of 13 to 15° K. The magnetic properties of the other compounds are not well known.

Prior attempts have been made to raise the Curie temperature ($T_c$) of EuO. These prior methods pertain to doping EuO both with other rare earth compounds such as RS, RO, and $R_2O_3$, where R is any of the rare earth elements, and with monovalent ions such as $F^-$, $Cl^-$, $Br^-$, and $I^-$. These various dopants raise the $T_c$ to varying degrees. RS doping and $R_2O_3$ doping produce materials with $T_c$ up to 135° K. The other dopants increase $T_c$ to approximately 85° K. The enhancement is described in terms of additional conduction electrons which are injected into the 5d conduction bands by the $R^{3+}$ ions.

It is an object of this invention to provide a rare earth metal oxide composition, specifically EuO, having an enhanced magnetic exchange, up to 150° K. $T_c$.

Another object of this invention is to provide a europium oxide ferromagnetic composition having an increased Curie temperature while additionally having an increased electrical resistivity.

A further object of this invention is to provide a europium oxide material having enhanced Curie temperature that is also chemically stable in air.

Yet another object is to provide a europium oxide ferromagnetic composition having an increased Faraday rotation above that found in pure europium oxide.

The foregoing and other objects, features and advantages of the invention will be apparent from the following more particular description of a preferred embodiment of the invention, as illustrated with the accompanying drawing.

SUMMARY OF THE INVENTION

In contrast to the above mentioned prior art attempts, this invention pertains to europium oxide films doped with both excess europium and a monovalent metal such as silver or copper. These films have a higher $T_c$ (150° K.) and a larger magnetization at 77° K. than do $R_2O_3$ doped films. In addition, the mechanism which enhances the ferromagnetic exchange in this case is different from other prior art mechanisms. The $X^+$ ions, where X=silver, copper or other monovalent metals, is located in a substitutional site and behaves like an acceptor. This is noted in that the resistivity increases, rather than decreases as in films described in the prior art where the doping behaves as a donor. Since there are excess $Eu^{2+}$ ions in the lattice, there will be $O^{2-}$ vacancies required to maintain charge neutrality. One of the unpaired electrons at the vacancy site is attracted to the $X^+$ ion, leaving behind an unpared electron which enhances the ferromagnetic exchange. Thus, the doping of EuO with both excess europium and a monovalent metal, enhances the ferromagnetic exchange in europium oxide while simultaneously increasing resistivity of the material.

Reference to the drawing, and the general description as follows will more particularly point out the invention and the compositional limitations thereon.

The drawing shows Faraday rotation as a function of temperature for a pure europium oxide film normalized to the Faraday rotation at 5° K. as the ordinate, versus temperature in degrees K. as the abscissa and for europium, silver, and copper doped europium oxide films.

GENERAL DESCRIPTION

Enhancement of ferromagnetic exchange in europium oxide crystals and films doped with trivalent rare earth ions has been extensively studied, as by Shafer and McGuire, Journal of Applied Physics, 39, 588 (1968), Ahn and McGuire, Journal of Applied Physics, 39, 5061 (1968), and Holtzberg, McGuire, Methfessel and Suits, Physical Review Letters, 13, 18, 1964. Europium oxide films doped with the 3d transition metal ions have resulted in an increased Curie temperature, $T_c$, to 180° K., as reported by Methfessel and Mattis, Handbuch der Physik, edited by F. Flugge (Springer-Verlag, Berlin, 1968, vol. 18, part 1, pages 389–562). The references cited above are incorporated herein for their general teachings and the state of the art of the doping of europium oxide materials for the purpose of increasing ferromagnetic exchange.

It is possible to increase the Curie temperature of europium oxide films by doping with other than the rare earth or 3d transition metal cation. Such films have been made which comprise europium oxide doped with both excess europium and a monovalent metal such as silver or copper. This invention will best be understood by first describing the compositions found to give the enhanced Curie temperature, followed by an explanation of typical methods of making such compositions, and the mechnism believed to be responsible for the effect.

Europium oxide exists as a face centered cubic sodium chloride type crystal structure. Europium oxide will accept excess divalent europium as a substitutional material.

It has been found that doping europium oxide with excess europium in an amount from approximately 10 to 50 atomic percent of europium oxide results in an increase in Curie temperature, as shown in the figure. There is a minimal but as yet an undetermined point at which europium may be added to europium oxide before an increase effect is noted. Beyond this point an increased Curie effect is observed. Thus, a small but effective amount of europium can be initially added to europium oxide to increase the Curie temperature. On the other hand, an unlimited amount of europium may not be added to europium oxide. A point is reached, at approximately 50 atomic percent, where the europium oxide material is saturated with the substitutional europium. This point is easily observed by one skilled in the art, for where enough excess europium is present, the Eu+EuO will spontaneously decompose in air to the trivalent oxygen and hydroxide compounds, such as EuOOH, and $Eu_2O_3$. Further, since many well known techniques are available for the measurement of Curie temperature, that point at which a small but effective amount of europium has been added to effect the Curie temperature of europium oxide is again easily observed. This small but effective amount is chosen here as that amount causing a minimum increase of 5° K. in Curie temperature of the europium oxide base material.

It has further been observed however, that the addition of a monovalent metal to the europium oxide, in addition to the excess divalent europium, causes a further increase in Curie temperature and a corresponding increase in electrical resistivity. The monovalent metal must be of a size for substitutional incorporation into the europium oxide lattice. Thus, monovalent metals having an ionic radius within approximately ±20 percent of the ionic radius of the size $Eu^{2+}$ are acceptable additional dopants. Europium oxide has a lattice parameter of 5.144 A. $Eu^{2+}$ has an ionic radius of 1.12 A. The corresponding oxygen atom $O^{2-}$ has an ionic radius of 1.40 A. Thus, acceptable dopants are silver, 1.26 A. ionic radius; copper, 0.96 A.; sodium, 0.95 A.; potassium, 1.33 A.; gold, 1.37 A.; and indium, 1.32 A. ionic radius.

It is noted however, that excess amounts of the monovalent metals do not have an effect beyond a given point. For example, the effective range in atomic percent of additional monovalent metal is between 0.20 and 2 atomic percent of the total atomic percent of dopant, europium and europium oxide. A further relationship does exist however in that the monovalent metal may not be present in an amount exceeding the amount of excess europium present. This would appear to be so because, for example, if 10 atomic percent excess europium were added, one could not add more than 10 atomic percent silver because at most only 10 atomic percent $O^{2-}$ vacancies would exist. Thus, the monovalent metal is added in an amount up to but not exceeding the excess europium to a total of 2 atomic percent monovalent metal in relation to total atomic percent. Doping levels of 3 to 7.7 atomic percent showed no further increase in $T_c$.

Such films may be made by various conventional means well known in the art. The ferromagnetic films of the figure were made in the following manner, which illustrate one method of making such compositions.

Both pure and doped europium oxide films are fabricated in a triple source ultra high vacuum system by the simultaneous thermal evaporation of $Eu_2O_3$ from an electron beam heatetd source, at about 2200° C. This generates Eu, EuO, and $O_2$ molecular species. Europium metal is evaporated from a resistively heated crucible at approximately 800° C., and a dopant metal from a second resistively heated crucible. The temperature of the second crucible will of course depend upon the melting point of the particular metal utilized. For silver, the temperature was 1000° C.; for copper, 1100° C.

Three ionization gauge rate monitors provide simultaneous and independent evaporation rate control. Base pressures of $2\times10^{-8}$ to $8\times10^{-8}$ torr are attained before deposition. During deposition, the pressure may vary from $5\times10^{-7}$ to $8\times10^{-6}$ torr. Substrates utilized for the deposition are fused quartz, glass, and $CaF_2$. These are heated to 150° C. before deposition. The deposited thickness of the films is 0.2 micron.

For films with no dopants other than excess europium, an evaporation rate ratio of Eu to $Eu_2O_3$, $r$, equal to 0.55 yields an EuO film with $T_c$=72° K., about the same as bulk EuO. From $T_c$ considerations alone, it is inferred that $r$=0.55 yields nearly stoichiometric films. For $r$=0.70, a europium doped film is fabricated with $T_c$=130° K. The figure shows a plot of Faraday rotation for these two films as a function of temperature. The Faraday rotation at a wavelength of 0.6 micron is normalized to unity at 5° K. and is measured with the magnetic field and incident light beam oriented at 45° with respect to the film surface.

A film with $r$=0.55 and an iron dopant level of 2.28 wt. percent showed $T_c$ of 88° K., and a film with $r$=0.70 and an iron dopant level of 2.13 wt. percent showed $T_c$=150° K. This increase in $T_c$ demonstrates the importance of excess europium for large enhancement of $T_c$.

Maintaining $r$ at 0.70, two particular examples are shown. In one, 0.38 atomic percent of silver was incorporated into europium enriched europium oxide films. In a second example, 1.0 atomic percent of copper was incorporated into europium enriched europium oxide films. The dopant level is determined by electron beam microprobe analysis. As indicated in the figure, the silver doped film shows $T_c$=150° K. and the copper doped film shows $T_c$=148° K. Since the europium, silver and copper doped films are all fabricated with the same value of $r$, the larger magnetization and the higher $T_c$ with silver and copper doped films is due directly to the additional non-magnetic dopants. The following table shows europium doped europium oxide films, and europium doped europium oxide films with the addition of silver and copper. Alpha is the absorption coefficient.

| Film | $r$ | $a_o$ (A.) | $\alpha$ (cm.$^{-1}$) | $T_c$ (° K.) |
|---|---|---|---|---|
| EuO | 0.55 | 5.144 | $14\times10^4$ | 72 |
| Eu+EuO | 0.70 | 5.136 | $17\times10^4$ | 130 |
| Ag+Eu+EuO | 0.70 | 5.135 | $17\times10^4$ | 150 |
| Cu+Eu+EuO | 0.70 | 5.138 | $17\times10^4$ | 148 |

Room temperature optical absorption spectra on these films was measured from 0.3 to 2.5 microns. The $4f^7$–$4f^65d(t_{2g})$ transition characteristic of the $Eu^{2+}$ ion appears at 0.62, 0.60 and 0.61 micron, respectively, for the Eu, Ag, and Cu doped films. These values are identical with stoichiometric europium oxide. The total absorption coefficients are $17\times10^4$ cm.$^{-1}$ for all the doped films. This characteristic europium oxide absorption is superimposed on a broad background absorption extending into the infrared. This background absorption increases with the doping level and is equal to $3\times10^4$ cm.$^{-1}$ for all these films.

X-ray diffraction spectra for all of these films show only europium oxide peaks. The lattice constants, $a_o$, for the europium oxide, silver and copper doped films are respectively 5.136 A., 5.135 A., and 5.138 A., and thus shom approximately a 0.2% contraction from the bulk value of 5.144 A. This suggests that the fraction of the excess europium which is dissolved in the lattice is on substitutional sites. The lattice contraction then arises from oxygen vacancies required for charge neutrality. The silver and copper dopants produced no further changes in $a_o$.

The change in $T_c$ due to a change in $a_o$ of europium oxide films has been previously reported in the art. A 1% lattice dilation decreased $T_c$ by 28%. Since the $a_o$ change is only 0.2% in these doped films and since $T_c$ changes by more than a factor of two, it is fair to conclude that the ferromagnetic enhancement is due to a mechanism other than a macroscopic lattice contraction.

The addition of the dopants increase the magnitude of the Faraday rotation and hence the magnetization, in the temperature region above 80° K. The figure shows that at 100° K. for example, the Faraday rotation for the Ag and Cu doped films to be 5 times larger than the film doped only with Eu.

Room temperature resistivity measurements also show the silver and copper doped films to have over two orders of magnitude higher resistivity than the europium doped film. If the mobility has not changed appreciably, this suggests that some of the silver and copper dopants are incorporated into the lattice as monovalent ions in substitutional sites. These ions will then behave as acceptors and decrease the conductivity. Since the infrared absorption is not changed when the silver and copper dopants are incorporated, it apparently is not sensitive to free carrier absorption but instead it may be due to absorption of europium metal precipitate. In contrast to previous doped europium oxide results, the silver and copper doped films show a decrease in conductivity with a corresponding increase in $T_c$. This suggests that the additional magnetic exchange coupling in these silver and copper doped films is not due to conduction electrons. It is possible that the two electrons associated with the oxygen vacancy have spins which are polarized in opposite directions and that the silver and copper, being acceptors, will capture one of the electrons, thereby leaving behind one unpaired electron which will enhance the exchange coupling.

While it is believed that the effect is as described above, with substitutional atom effects occurring, nonetheless, the quantities and relationships of materials involved does give the desired ferromagnetic effects. Others skilled in the art will be aware of how to otherwise manufacture and produce ferromagnetic europium oxide films of the composition described, by such means as sputtering, vapor deposition, diffusion, and other means.

What is claimed is:

1. A ferromagnetic composition of matter consisting essentially of:

EuO, excess Eu and a monovalent metal wherein the excess divalent Eu is present in a quantity between 10–50 atomic percent of the EuO; and said monovalent metal is chosen from those monovalent metals having an ionic radius within approximately ±20% of the ionic radius of divalent Eu, in a quantity between .2 to 2 atomic percent of the total atomic percent of EuO+Eu+monovalent metal.

2. The composition of claim 1 wherein said monovalent metal is chosen from the group consisting of Ag, Cu, Na, K, Au, In.

3. The composition of claim 1 wherein said Eu is present in an amount of substantially 20 atomic percent of EuO, and the monovalent metal is present in an amount of substantially 0.38 atomic percent of the total atomic percent of EuO+Eu+monovalent metal.

4. The composition of claim 1 wherein said Eu is present in an amount of substantially 20 atomic percent of EuO, and the monovalent metal is present in an amount of substantially 1.0 atomic percent of the total atomic percent of EuO+Eu+monovalent metal.

References Cited

UNITED STATES PATENTS

| | | | |
|---|---|---|---|
| 3,371,041 | 2/1968 | Holtzberg et al. ---- | 252—62.51 |
| 3,539,382 | 11/1970 | Ahn et al. -------- | 252—62.55 X |
| 3,488,286 | 1/1970 | Holtzberg et al. ---- | 252—62.51 |

TOBIAS E. LEVOW, Primary Examiner

J. COOPER, Assistant Examiner

U.S. Cl. X.R.

252—62.51